US011323028B2

(12) United States Patent
Li

(10) Patent No.: US 11,323,028 B2
(45) Date of Patent: May 3, 2022

(54) VOLTAGE CONVERTING APPARATUS

(71) Applicant: Nuvoton Technology Corporation, Hsinchu (TW)

(72) Inventor: Cheng-Tao Li, Hsinchu (TW)

(73) Assignee: Nuvoton Technology Corporation, Hsinchu (TW)

( * ) Notice: Subject to any disclaimer, the term of this patent is extended or adjusted under 35 U.S.C. 154(b) by 203 days.

(21) Appl. No.: 16/744,195

(22) Filed: Jan. 16, 2020

(65) Prior Publication Data
US 2020/0274444 A1  Aug. 27, 2020

(30) Foreign Application Priority Data

Feb. 25, 2019 (TW) ................................. 108106216

(51) Int. Cl.
*H02M 3/156* (2006.01)
*H02M 1/08* (2006.01)
*H02M 3/06* (2006.01)
*H02M 1/00* (2006.01)

(52) U.S. Cl.
CPC ............. *H02M 3/156* (2013.01); *H02M 1/08* (2013.01); *H02M 3/06* (2013.01); *H02M 1/0009* (2021.05)

(58) Field of Classification Search
CPC .......... H02M 3/156; H02M 1/08; H02M 3/06; H02M 1/0009; H02M 1/0025; G05F 1/625
USPC .......................................................... 323/282
See application file for complete search history.

(56) References Cited

U.S. PATENT DOCUMENTS

| 8,138,734 | B2 | | 3/2012 | Xi et al. |
| 9,356,510 | B2 | * | 5/2016 | Jiang ....................... H02M 1/36 |
| 9,641,078 | B2 | * | 5/2017 | Fukumoto ........... H02M 3/1588 |
| 2011/0001461 | A1 | * | 1/2011 | Lu .......................... H02J 7/0031 |
| | | | | 323/283 |

(Continued)

FOREIGN PATENT DOCUMENTS

| CN | 108574410 | 9/2018 |
| TW | 201217936 | 5/2012 |

(Continued)

OTHER PUBLICATIONS

Received STIC search report from EIC 2800 searcher Salim Alam for claim 1 dated Mar. 23, 2021. (Year: 2021).*

*Primary Examiner* — Emily P Pham
*Assistant Examiner* — Htet Z Kyaw
(74) *Attorney, Agent, or Firm* — JCIPRNET

(57) ABSTRACT

A voltage converting apparatus includes a comparison circuit, a compensation signal generator, and a voltage converter. The comparison circuit generates a comparison result according to an output voltage, an input voltage, and a compensated feedback signal. The compensation signal generator provides a compensation signal held to be equal to a reference voltage at a first time interval in an enable period in a working cycle and sets the compensation signal to be a ramp signal at a second time interval in the enable period. The compensation signal generator generates the compensated feedback signal according to a feedback signal and the compensation signal. The voltage converter generates a control signal according to the comparison result, performs a voltage converting operation through an inductor according to the control signal, and generates the output voltage. The feedback signal is generated according to a current on the inductor.

10 Claims, 5 Drawing Sheets

(56) References Cited

U.S. PATENT DOCUMENTS

| | | | | |
|---|---|---|---|---|
| 2011/0074373 A1* | 3/2011 | Lin | ................ | H02M 3/156 |
| | | | | 323/282 |
| 2011/0316518 A1* | 12/2011 | Feng | ................ | H02M 3/156 |
| | | | | 323/349 |
| 2012/0038341 A1* | 2/2012 | Michishita | ............ | H02M 3/156 |
| | | | | 323/284 |
| 2012/0146608 A1* | 6/2012 | Wan | ................ | H02M 3/156 |
| | | | | 323/284 |
| 2013/0099761 A1* | 4/2013 | Dong | ................ | H02M 3/156 |
| | | | | 323/271 |
| 2013/0147456 A1* | 6/2013 | Chien | ................ | H02M 3/156 |
| | | | | 323/288 |
| 2014/0167716 A1* | 6/2014 | Chen | ................ | H02M 3/156 |
| | | | | 323/271 |
| 2014/0197811 A1* | 7/2014 | Qiu | ................ | H02M 3/156 |
| | | | | 323/282 |
| 2014/0225584 A1* | 8/2014 | Dong | ................ | H02M 3/156 |
| | | | | 323/284 |
| 2014/0266117 A1* | 9/2014 | Goncalves | ............ | H02M 1/08 |
| | | | | 323/283 |
| 2016/0006352 A1* | 1/2016 | Hang | ................ | H02M 3/158 |
| | | | | 323/288 |
| 2016/0373007 A1* | 12/2016 | Lu | ................ | H02M 3/158 |
| 2018/0152103 A1 | 3/2018 | Mansri et al. | | |
| 2018/0152105 A1* | 5/2018 | Ohyama | ............ | H02M 3/158 |

FOREIGN PATENT DOCUMENTS

| | | |
|---|---|---|
| TW | 201640804 | 11/2016 |
| TW | 201713023 | 4/2017 |
| TW | 201824718 | 7/2018 |
| TW | 646766 | 1/2019 |

* cited by examiner ly in the technical field, current mode dc/dc converters are widely used. The current mode voltage converters feature effects such as favorable dynamic performance, high precision, instantaneous large gain bandwidth, and current limiting protection.

VOLTAGE CONVERTING APPARATUS

CROSS-REFERENCE TO RELATED APPLICATION

This application claims the priority benefit of Taiwan application serial no. 108106216, filed on Feb. 25, 2019. The entirety of the above-mentioned patent application is hereby incorporated by reference herein and made a part of this specification.

BACKGROUND

Technical Field

The invention relates to a voltage converting apparatus. More particularly, the invention relates to a current mode voltage converting apparatus.

Description of Related Art

Presently in the technical field, current mode dc/dc converters are widely used. The current mode voltage converters feature effects such as favorable dynamic performance, high precision, instantaneous large gain bandwidth, and current limiting protection.

A conventional current mode voltage converter can ensure the stability of the circuit loop by using a compensation signal acting as a ramp signal. In existing arts, a single-slope ramp signal or a multi-segment piecewise linear ramp signal can be used as the compensation signal.

When a single-slope ramp signal is used as the compensation signal, peak current limitation becomes a problem when the conduction time of the power transistor becomes long. The reason for that is because the compensation signal linearly increases, and when the conduction time of the transistor increases, voltage value of the comparison voltage increases correspondingly, and the current peak on the inductor is limited.

When a multi-segment piecewise linear ramp signal is used as the compensation signal, the different segments of the multi-segment ramp signal correspond to different setting duty cycles. When the duty cycle for switching the transistor is located at an edge between two setting duty cycles, frequency uttering may be generated.

SUMMARY

The invention provides a voltage converting apparatus capable of improving the peak current limitation and preventing from ramp voltage jitter generation caused by erroneous frequency switching operation.

A voltage converting apparatus according to an embodiment of the invention includes a comparison circuit, a compensation signal generator, and a voltage converter. The comparison circuit generates an error signal according to an output voltage and an input voltage and compares the error signal and a compensated feedback signal to generate a comparison result. The compensation signal generator provides a compensation signal held to be equal to a reference voltage at a first time interval in an enable period in a working cycle and sets the compensation signal to be a ramp signal at a second time interval in the enable period. The compensation signal generator further generates the compensated feedback signal according to a feedback signal and the compensation signal. The voltage converter includes an inductor, generates a control signal according to the comparison result, provides a drive signal according to the control signal, and performs a voltage converting operation according to the drive signal through the inductor, to generate the output voltage. The feedback signal is generated according to a current on the inductor.

To sum up, in the embodiments of the invention, the compensation signal provided by the compensation signal generator is held to be equal to the reference voltage at the first time interval in the working cycle and is set to be a ramp signal at the second time interval of the working cycle. In this way, the compensation signal does not cause a peak current limitation due to the rise time being too long in the duty cycle. Further, at the second time interval, the ramp signal provided by the compensation signal can have a relatively steep slope, so that voltage jittering caused by frequency switching operation is prevented from being generated.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
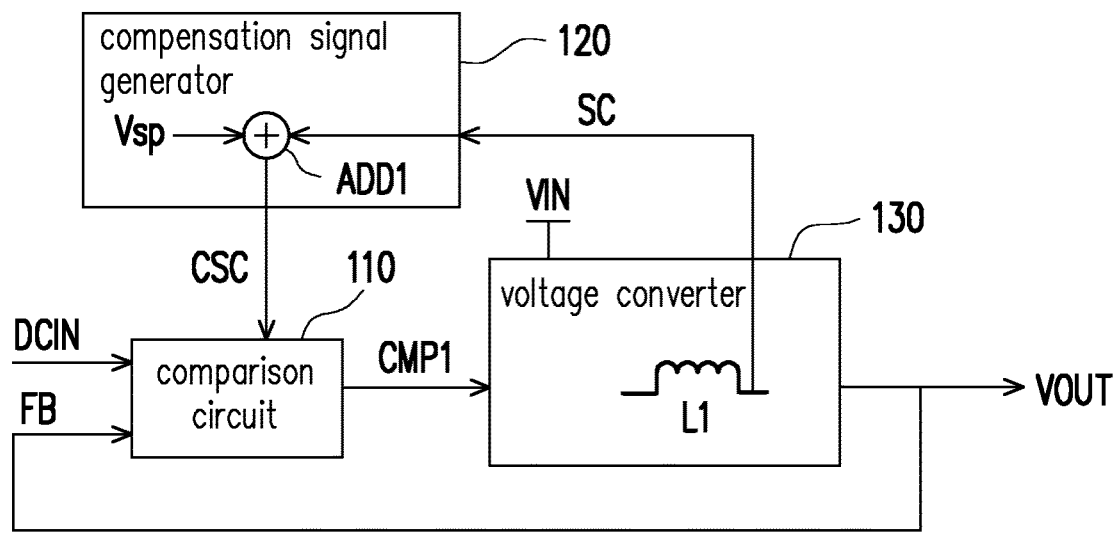
FIG. 1 is a schematic diagram illustrating a voltage converting apparatus according to an embodiment of the invention.

With reference to FIG. 1, FIG. 1 is a schematic diagram illustrating a voltage converting apparatus according to an embodiment of the invention. A voltage converting apparatus 100 includes a comparison circuit 110, a compensation signal generator 120, and a voltage converter 130. The comparison circuit 110 generates an error signal according to an output voltage VOUT and a reference voltage DCIN of the voltage converting apparatus 100 and compares the error signal and a compensated feedback signal CSC to generate a comparison result CMP1. In the embodiment of the invention, the voltage converting apparatus 100 may generate a voltage FB according to the output voltage VOUT. In other embodiments of the invention, the voltage converting apparatus 100 may perform voltage division for the output voltage VOUT and obtain the voltage FB according to the divided voltage. The comparison circuit 110 may generate an error voltage by calculating a difference between the voltage FB and the reference voltage DCIN.

The compensation signal generator 120 is coupled to the voltage converter 130 and the comparison circuit 110. The compensation signal generator 120 generates a compensation signal $V_{SP}$ and receives a feedback signal SC. The compensation signal generator 120 may further enable the feedback signal SC to be added to the compensation signal $V_{sp}$ through a voltage operator ADD1, to generate the compensated feedback signal CSC. Herein, the compensation signal generator 120 may provide the compensation signal $V_{sp}$ held to be equal to a reference grounding voltage at a first time interval in an enable period in a working cycle and set the compensation signal $V_{sp}$ to be a ramp signal at a second time interval in the enable period in the working cycle. Herein, the second time interval follows the first time interval, and the feedback signal SC may be generated through detecting a current on an inductor L1 in the voltage converter 130.

The voltage converter 130 is coupled to the compensation signal generator 120 and the comparison circuit 110. The voltage converter 130 receives the comparison result CMP1, generates a control signal according to the comparison result CMP1, provides a drive signal LX to drive the inductor L1 according to the control signal, and accordingly performs a voltage conversion operation. In this embodiment, the voltage converter 130 may perform a buck voltage conversion operation to convert an input voltage VIN into the output voltage VOUT.

Figure 2:
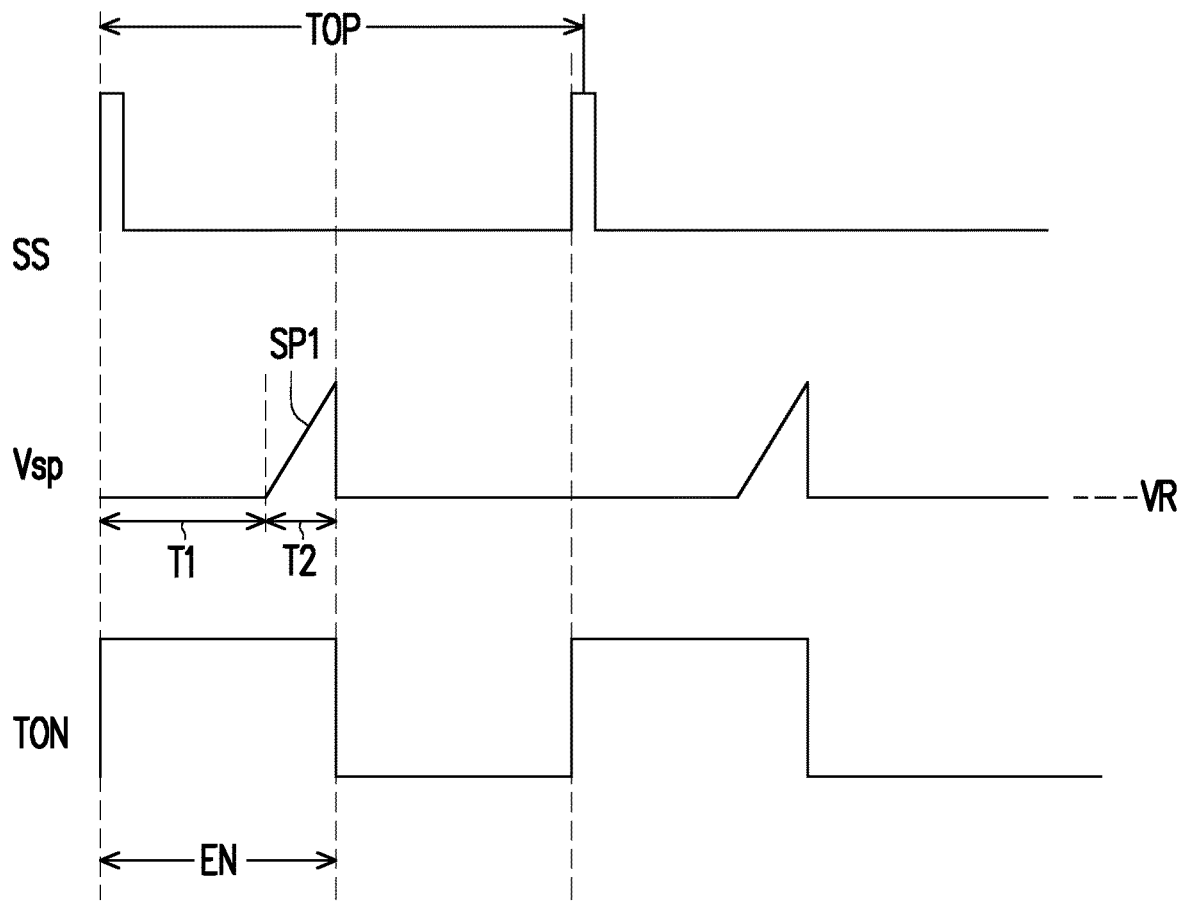
FIG. 2 is a waveform diagram illustrating the voltage converting apparatus according to an embodiment of the invention.

The voltage converter 130 may periodically generate the control signal and provide the drive signal LX to drive the inductor L1 in the enable period of the working cycle. With reference to FIG. 1 and FIG. 2 together, FIG. 2 is a waveform diagram illustrating the voltage converting apparatus according to an embodiment of the invention.

In FIG. 2, a control signal TON provides a positive voltage pulse in an enable period EN, and the voltage converter 130 generates the drive signal LX to drive the inductor L1 according to the positive voltage pulse of the control signal TON. A setting signal SS is configured to control a length of a working cycle TOP. The control signal TON has a duty cycle, and the duty cycle of the control signal TON may be determined according to a ratio of the input voltage VIN to the output voltage VOUT. Further, a length of the enable period EN is directly proportional to the duty cycle of the control signal TON. Note that in this embodiment, the compensation signal generator 120 generates the compensation signal $V_{sp}$ held to be equal to a reference grounding voltage VR at a first time interval T1 in the enable period EN and sets the compensation signal $V_{SP}$ to be a ramp signal SP1 at a second time interval T2 after the first time interval T1 in the enable period EN.

Note that the compensation signal $V_{sp}$ in the embodiments of the invention is held to be equal to the reference grounding voltage VR at the first time interval T1. The compensation signal $V_{sp}$ rises in the form of the ramp signal SP1 at the second time interval T2. In this way, a voltage value of the compensation signal $V_{sp}$ may not rise continuously in the entire enable period EN, so that a peak current limitation is prevented from occurring. Further, as the compensation signal $V_{sp}$ rises rapidly at the second time interval T2, stability of the comparison result CMP1 generated by the comparison circuit 110 is increased as well, so that ramp voltage jitter is prevented from occurring.

Figure 3:
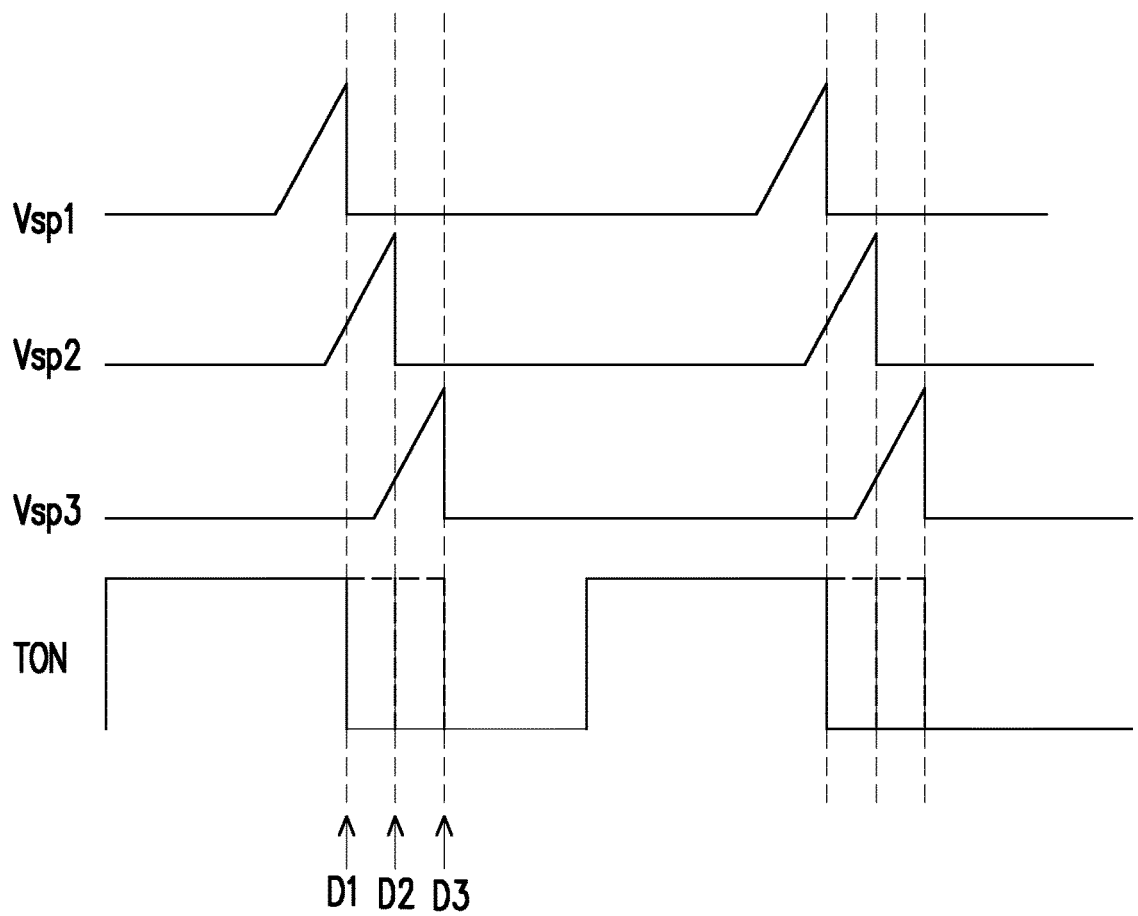
FIG. 3 and FIG. 4 are schematic diagrams illustrating compensation signals generated by the voltage converting apparatus corresponding to a control signal of different duty cycles according to an embodiment of the invention.
Figure 4:
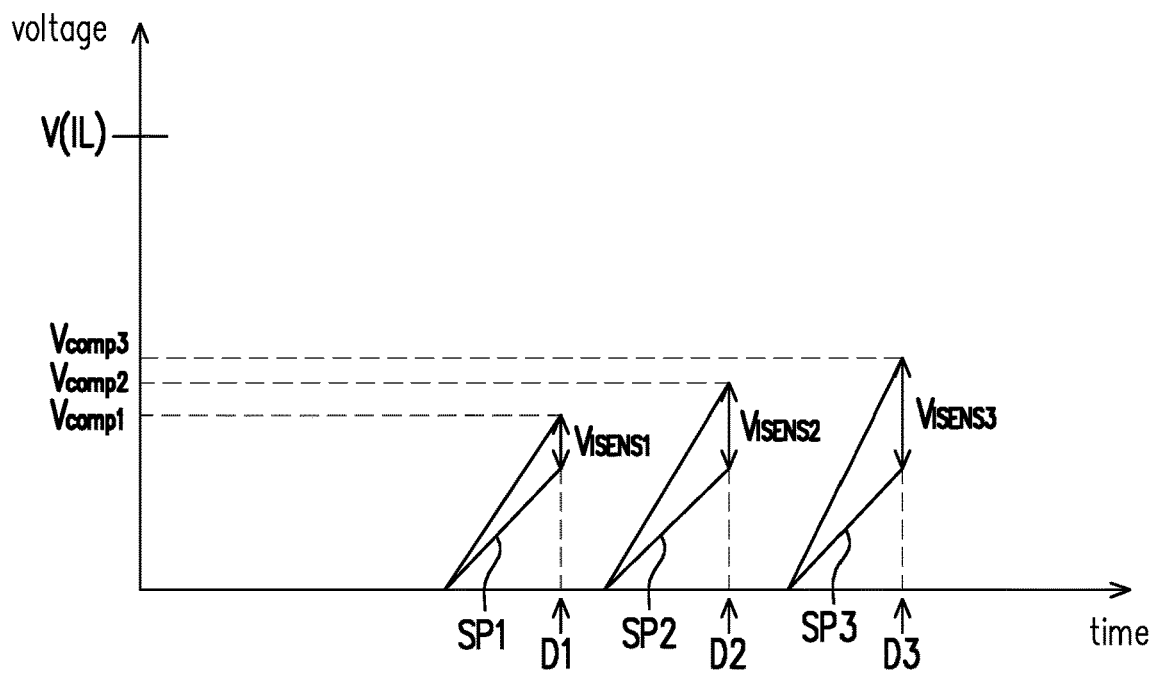

With reference to FIG. 1, FIG. 3, and FIG. 4 together, FIG. 3 and FIG. 4 are schematic diagrams illustrating compensation signals generated by the voltage converting apparatus corresponding to a control signal of different duty cycles according to an embodiment of the invention. In FIG. 3, the compensation signal generator 120 in the voltage converting apparatus 100 may correspond to different duty cycles D1 to D3 of the control signal TON to generate a compensation signal $V_{SP1}$, a compensation signal $V_{SP2}$, and a compensation signal $V_{SP3}$, respectively. Herein, the duty cycle D1< the duty cycle D2< the duty cycle D3.

In FIG. 4, for different duty cycles D1 to D3, the voltage converting apparatus 100 uses ramp signals SP1 to SP3 provided by the compensation signals $V_{SP1}$, $V_{SP2}$, and $V_{SP3}$, respectively In this way, when the comparison circuit 110 makes comparison, comparison voltages $V_{comp1}$ to $V_{comp3}$ required by sufficiently large comparison boundaries $V_{ISENS1}$ to $V_{ISENS3}$ are relatively smaller than a voltage V(IL), which is generated on the inductor L1 according to a maximum limiting current IL. Therefore, the peak current limitation is prevented from occurring in the voltage converting apparatus 100.

Figure 5:
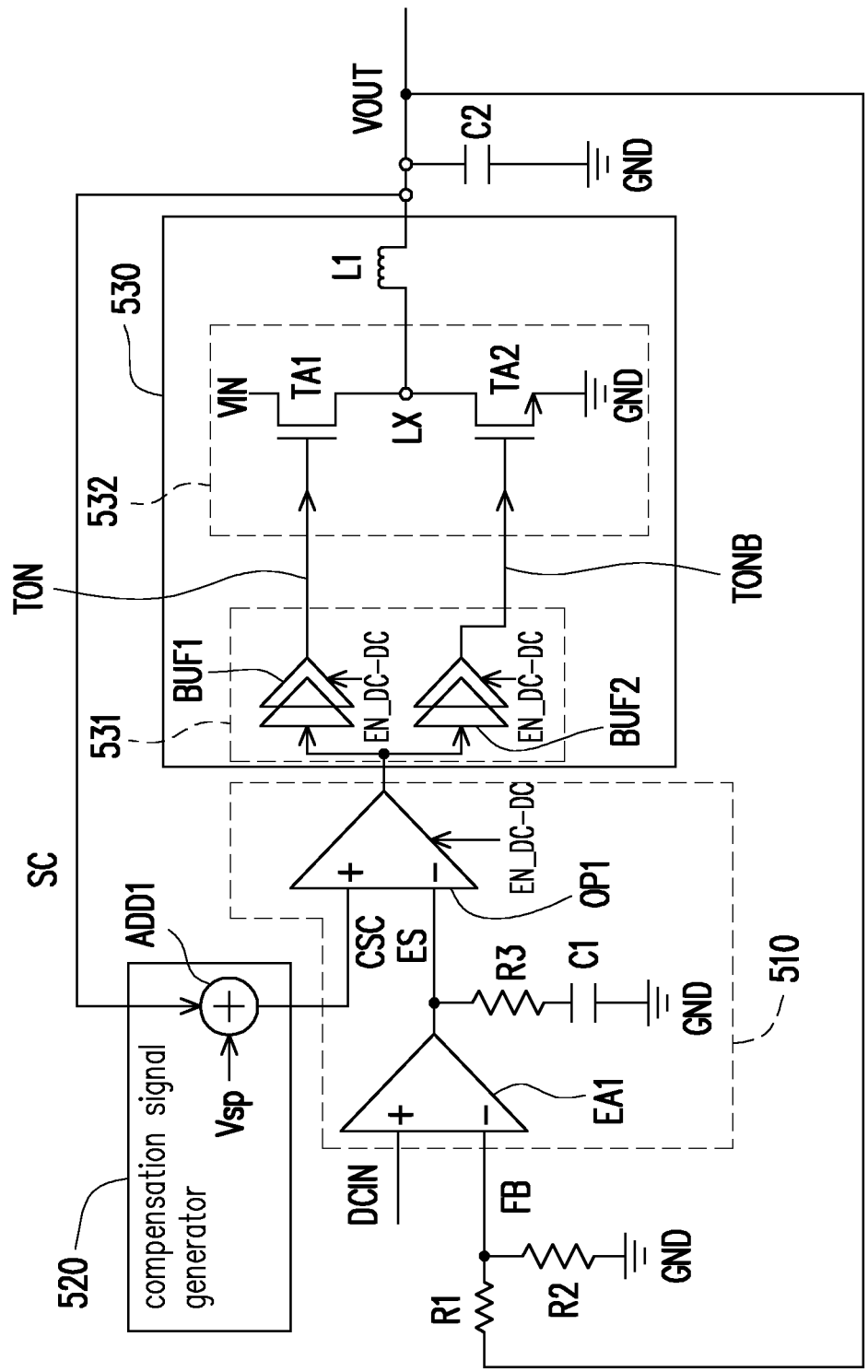
FIG. 5 is a schematic diagram illustrating a voltage converting apparatus according to another embodiment of the invention.

With reference to FIG. 5, FIG. 5 is a schematic diagram illustrating a voltage converting apparatus according to another embodiment of the invention. A voltage converting apparatus 500 includes a comparison circuit 510, a compensation signal generator 520, and a voltage converter 530. The comparison circuit 510 includes an error amplifier EA1 and a comparator OP1. The error amplifier EA1 and the comparator OP1 may both be constructed by an operational amplifier. The error amplifier EA1 receives the reference voltage DCIN and the voltage FB, and calculates a difference between the reference voltage DCIN and the voltage FB to generate an error signal ES. A resistor R1 and a resistor R2 may form a voltage division circuit. The voltage FB may be a divided voltage generated by performing voltage division to the output voltage VOUT by the voltage division circuit. Incidentally, a resistor capacitor circuit formed by a resistor R3 and a capacitor C1 may be connected between an output terminal of the error amplifier EA1 and a reference grounding end GND in series and may serve as a voltage regulator circuit for the error signal ES.

The comparator OP1 receives the error signal ES and the compensated feedback signal CSC provided by the compensation signal generator 520. The comparator OP1 generates a comparison result by comparing the compensated feedback signal CSC with the error signal ES. From another perspective, the comparator OP1 may be activated according to a signal EN_DC-DC.

The voltage converter 530 includes a control signal generator 531, a driver 532, and the inductor L1. The control signal generator 531 receives the comparison result generated by the comparator OP1 and generates the control signal TON and a control signal TONB according to the comparison result. The control signal TON and the control signal TONB may be mutually inverted signals. In this embodiment, the control signal generator 531 includes a buffer BUF1 and a buffer BUF2, which are activated according to the signal EN_DC-DC and generate the control signal TON and the control signal TONB respectively.

The driver 532 includes a transistor TA1 and a transistor TA2. The transistor TA1 and the transistor TA2 are connected to each other in series between the input voltage VIN and the reference grounding end GND, and are coupled to the inductor L1. The transistor TA1 and the transistor TA2 are alternatively turned on and turned off respectively according to the control signal TON and the control signal TONB, so as to provide a drive signal to the inductor L1 and to perform the voltage converting operation on the input voltage VIN to generate the output voltage VOUT.

In this embodiment, the voltage converting apparatus 500 further includes a capacitor C2. The capacitor C2 is coupled between an output terminal of the voltage converting apparatus 500 and the reference grounding end GND, and the capacitor C2 is configured to serve as a voltage regulator capacitor.

In this embodiment, the compensation signal generator 520 includes the voltage operator ADD1 acting as a voltage adder. The compensation signal generator 520 receives the feedback signal SC generated according to the current on the inductor L1, generates the compensation signal $V_{SP}$, and uses the voltage operator ADD1 to add the feedback signal SC with the compensation signal $V_{SP}$, so as to generate the compensated feedback signal CSC. The compensation signal generator 520 also provides the compensated feedback signal CSC to the comparator OP1.

Figure 6:
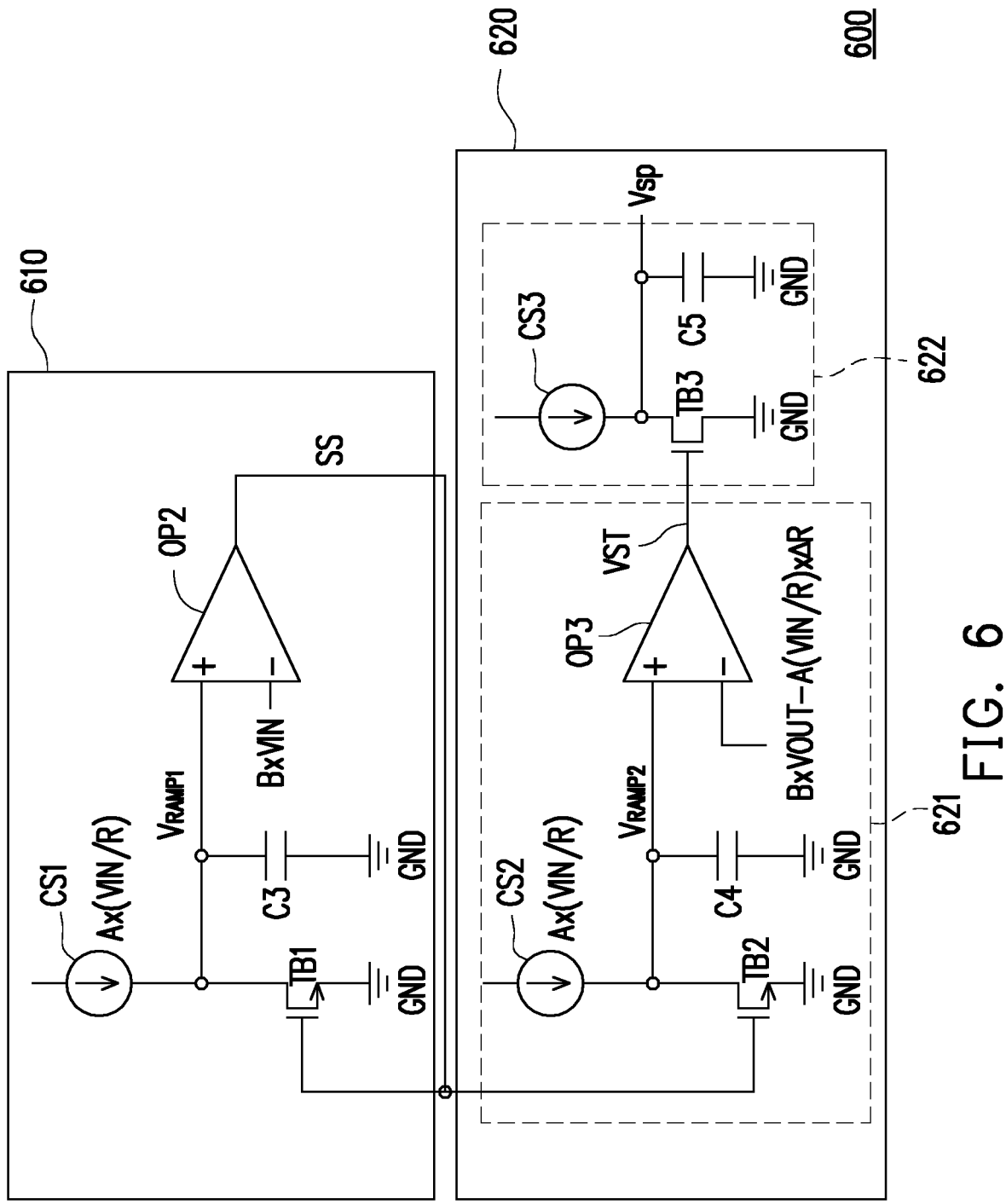
FIG. 6 is a schematic diagram illustrating implementation of a compensation signal generator according to an embodiment of the invention.

For details of implementation of the compensation signal generator 520, please refer to the schematic diagram of FIG. 6 illustrating implementation of a compensation signal generator according to an embodiment of the invention.

In FIG. 6, a compensation signal generator 600 includes a working cycle decision circuit 610 and a compensation signal decision circuit 620. The working cycle decision circuit 610 generates a setting signal SS according to the input voltage VIN and the output voltage VOUT, and the setting signal SS is configured to set a working cycle of a voltage converting apparatus. In this embodiment, the working cycle decision circuit 610 includes a current source CS1, a capacitor C3, a comparator constructed by an operational amplifier OP2, and a reset switch constructed by a transistor TB1. The current source CS1 may generate a charging current according to the input voltage VIN and a resistance value R, and the charging current=A×(VIN/R), where parameter A is a real number greater than 0. A positive input terminal of the operational amplifier OP2 is coupled to the current source CS1 to receive a first voltage $V_{RAMP1}$, and a negative input terminal of the operational amplifier OP2 receives a second voltage. The second voltage may be generated according to the input voltage VIN and may be equal to B×VIN, where parameter B is a real number greater than 0. The capacitor C3 is connected in series between a positive input terminal of the operational amplifier OP2 and the reference grounding end GND, and the transistor TB1 is also connected in series between the positive input terminal of the operational amplifier OP2 and the reference grounding end GND and is controlled by the setting signal SS. An output terminal of the operational amplifier OP2 generates the setting signal SS.

As regards the operation of the working cycle decision circuit 610, in an initial state, when the transistor TB1 is turned on according to the setting signal SS with high voltage level, the capacitor C3 may be discharged, and the first voltage $V_{RAMP1}$ may be equal to the reference grounding voltage at this time. As regards a voltage value of the first voltage $V_{RAMP1}$, the operational amplifier OP2 sets the setting signal SS to be a low voltage level and enables the transistor TB1 to be turned off according to the low voltage setting signal SS. At the same time, the charging current provided by the current source CS1 may be used to charge the capacitor C3, so as to generate the first voltage $V_{RAMP1}$ acting as a ramp voltage. When the first voltage $V_{RAMP1}$ rises to be greater than the second voltage, the operational amplifier OP2 resets the setting signal SS to the high voltage level. Through the setting signal SS periodically generated to be the high voltage level and the low voltage level, two adjacent high voltage pulses of the setting signal SS may define one working cycle of the voltage converting apparatus.

From another perspective, the compensation signal decision circuit 620 calculates a voltage difference according to the input voltage VIN and the output voltage VOUT, determines the first time interval and the second time interval according to the input voltage VIN and the voltage difference, provides the compensation signal $V_{sp}$ held to be equal to the reference grounding voltage at the first time interval, and sets the compensation signal $V_{sp}$ to be the ramp signal at the second time interval. The compensation signal decision circuit 620 includes a front stage circuit 621 and an output stage circuit 622. The front stage circuit 621 calculates the voltage difference according to the output voltage VOUT and the input voltage VIN, and determines the first time interval and the second time interval according to the input voltage VIN and the voltage difference. The output stage circuit 622 is coupled to the front stage circuit 621, provides the compensation signal $V_{sp}$ held to be equal to the reference grounding voltage at the first time interval, and sets the compensation signal to be the ramp signal at the second time interval.

In this embodiment, the front stage circuit 621 includes a current source CS2, a capacitor C4, and a comparator constructed by the operational amplifier OP2. The current source CS2 provides a charging current. A current value of the charging current provided by the current source CS2 may be identical to a current value of the charging current provided by the current source CS1. A positive input terminal of an operational amplifier OP3 is coupled to the current source CS2 to receive a third voltage $V_{RAMP2}$, and a negative input terminal of the operational amplifier OP3 receives a fourth voltage. The fourth voltage may be generated according to the input voltage VIN and the output voltage VOUT and may be equal to B×VOUT−A×(VIN/R)×ΔR, where ΔR is an adjustment ratio. The capacitor C4 is connected in series between the positive input terminal of the operational amplifier OP3 and the reference grounding end GND, and the transistor TB2 is also connected in series between the positive input terminal of the operational amplifier OP3 and the reference grounding end GND and is controlled by the setting signal SS. A negative output terminal of the operational amplifier OP3 generates an activation signal VST.

The A, B, resistance value R, and adjustment ratio ΔR may be designed by a designer and are not particularly limited.

The output stage circuit 622 includes a current source CS3, a reset switch constructed by a transistor TB3, and a capacitor C5. The current source CS3 provides a charging current. The transistor TB3 is connected in series between the current source CS3 and the reference grounding end GND and is controlled by the activation signal VST. The capacitor C5 is coupled to the transistor TB3 in parallel. In addition, a node coupled to the transistor TB3 and the current source CS3 generates the compensation signal $V_{SP}$. When the transistor TB3 is turned on according to the activation signal VST, the output stage circuit 622 may generate the compensation signal $V_{SP}$ held to be equal to the reference grounding voltage. When the transistor TB3 is turned off according to the activation signal VST, the output stage circuit 622 may generate the compensation signal $V_{SP}$ acting as the ramp signal. Herein, a slope of the compensation signal $V_{SP}$ may be associated with the current value of the charging current generated by the current source CS3.

As regards the operational details, in the initial state, the transistor TB2 is turned on according to the setting signal SS. The capacitor C4 performs discharging through the turned-on transistor TB2 and generates a third voltage $V_{RAMP2}$ equal to the reference grounding voltage. At this time, the negative output terminal of the operational amplifier OP3 generates the high voltage activation signal VST according to the third voltage $V_{RAMP2}$ and a fourth voltage which is greater than the third voltage $V_{RAMP2}$. When the setting signal SS is set to be a low voltage level, the transistor TB2 is turned off, and the current source CS2 provides the charging current to charge the capacitor C4 and generates the third voltage $V_{RAMP2}$ acting as the ramp voltage. At the first time interval when the fourth voltage is kept to be greater than the third voltage $V_{RAMP2}$, the transistor TB3 continues to be turned on, and the output stage circuit 622 is enabled to generate the compensation signal $V_{SP}$ held to be equal to the reference grounding voltage. At the second time interval when the fourth voltage is kept to be equal to or less than the third voltage $V_{RAMP2}$, the transistor TB3 is turned off, and the output stage circuit 622 is enabled to generate the compensation signal $V_{SP}$ acting as the ramp signal.

In the embodiment of FIG. 6, when parameters A and B are set to be identical, the working cycle may be determined according to the resistance value R of the current source CS1 and a capacitance of the capacitor C3. In addition, through comparing a rising speed of the third voltage $V_{RAMP2}$ and/or the voltage value of the fourth voltage, a length of the enable period may be set. In this embodiment, the length of the enable period may be adjusted, that is, the duty cycle of the control signal may be adjusted, through changing the adjustment ratio $\Delta R$. Taking the adjustment ratio $\Delta R$ equal to 0 for example, $\Delta \times (VIN/R) = C4 \times (B \times VOUT)/dT$, and the enable period of the control signal is equal to $T_{total} \times (VOUT/VIN)$, where $T_{total}$ is equal to the working cycle.

Figure 7:
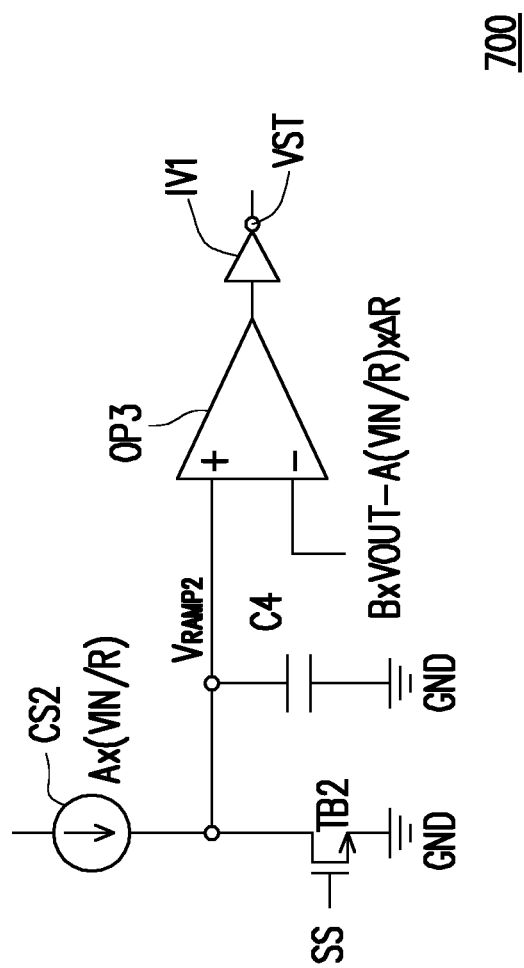
FIG. 7 is a schematic diagram illustrating a compensation signal decision circuit according to another embodiment of the invention.

With reference to FIG. 7, FIG. 7 is a schematic diagram illustrating a compensation signal decision circuit according to another embodiment of the invention. Herein, a front stage circuit 700 in a compensation signal decision circuit is different from the front stage circuit 621, and a forward output terminal of the operational amplifier OP3 may be coupled to an inverter IV1 and generates the activation signal VST through the inverter IV1.

In view of the foregoing, in the voltage converting apparatus provided by the invention provides the compensation signal held to be equal to the reference grounding voltage at the first time interval in the enable period in the working cycle through the compensation signal generator and sets the compensation signal to be the ramp signal at the second time interval in the enable period. In this way, the peak current limitation is prevented from occurring, and voltage jittering caused by switching frequencies is prevented from being generated.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A voltage converting apparatus, comprising:
   a comparison circuit, generating an error signal according to an output voltage and a reference voltage, and comparing the error signal with a compensated feedback signal to generate a comparison result;
   a compensation signal generator, providing a compensation signal held to equal a reference grounding voltage at a first time interval in an enable period of a control signal, setting the compensation signal to be a ramp signal at a second time interval in the enable period of the control signal, and adding a feedback signal and the compensation signal together to form the compensated feedback signal, wherein the enable period of the control signal is a time period in which the control signal keeps a positive voltage level; and
   a voltage converter, having an inductor, generating the control signal according to the comparison result, providing a drive signal according to the control signal, and performing a voltage converting operation according to the drive signal through the inductor, to convert an input voltage into the output voltage,
   wherein the feedback signal is generated according to a current on the inductor.

2. The voltage converting apparatus as claimed in claim 1, wherein a duty cycle of the control signal is equal to a ratio of the output voltage to the input voltage, and a length of the enable period is proportional to the duty cycle of the control signal.

3. The voltage converting apparatus as claimed in claim 1, wherein the compensation signal generator adds the compensation signal with the feedback signal, to generate the compensated feedback signal.

4. The voltage converting apparatus as claimed in claim 1, wherein the compensation signal generator comprises:
   a working cycle decision circuit, setting a working cycle of the voltage converting apparatus according to the input voltage and the output voltage;
   a compensation signal decision circuit, calculating a voltage difference according to the output voltage and the input voltage, determining the first time interval and the second time interval according to the input voltage and the voltage difference, providing the compensation signal held to equal the reference grounding voltage at the first time interval, and setting the compensation signal to be the ramp signal at the second time interval; and
   a voltage operator, coupled to the compensation signal decision circuit, performing an arithmetic operation on the compensation signal and the feedback signal to generate the compensated feedback signal.

5. The voltage converting apparatus as claimed in claim 4, wherein the working cycle decision circuit comprises:
   a first current source, generating a first charging current according to the input voltage and a resistance value;
   a first capacitor, receiving the first charging current to generate a first voltage, wherein the first voltage is a ramp voltage;
   a first comparator, receiving the first voltage and a second voltage generated according to the input voltage, comparing the first voltage with the second voltage to generate a setting signal; and
   a first reset switch, coupled to the first capacitor in parallel, receiving the setting signal, and performing a discharging operation to the first capacitor according to the setting signal.

6. The voltage converting apparatus as claimed in claim 5, wherein the compensation signal decision circuit comprises:
   a front stage circuit, calculating the voltage difference according to the output voltage and the input voltage, and determining the first time interval and the second time interval according to the input voltage and the voltage difference; and
   an output stage circuit, coupled to the front stage circuit, providing the compensation signal held to be equal to the reference grounding voltage at the first time interval, and setting the compensation signal to be the ramp signal at the second time interval.

7. The voltage converting apparatus as claimed in claim 6, wherein the front stage circuit comprises:
- a second current source, generating a second charging current, wherein a current value of the second charging current is equal to a current value of the first charging current;
- a second capacitor, receiving the second charging current to generate a third voltage, wherein the third voltage is a ramp voltage;
- a second comparator, receiving the third voltage and a fourth voltage generated according to the input voltage and the output voltage, and comparing the third voltage with the fourth voltage to generate an activation signal; and
- a second reset switch, coupled to the second capacitor in parallel, receiving the setting signal, and performing a discharging operation to the second capacitor according to the setting signal.

8. The voltage converting apparatus as claimed in claim 7, wherein the output stage circuit comprises:
- a third current source, generating a third charging current;
- a third reset switch, coupled between the third current source and a reference grounding end, controlled by the activation signal to provide the reference grounding voltage to generate the compensation signal at the first time interval; and
- a third capacitor, coupled to the third current source, receiving the third charging current to perform in charging at the second time interval, so as to generate the ramp signal.

9. The voltage converting apparatus as claimed in claim 8, wherein the third reset switch is a transistor, a first terminal of the transistor is coupled to the third current source, a second terminal of the transistor is coupled to the reference grounding end to receive the reference grounding voltage, and a control terminal of the transistor receives the activation signal;
wherein the second comparator is an operational amplifier, a positive input terminal of the operational amplifier receives the third voltage, a negative input terminal of the operational amplifier receives the fourth voltage, and an inverting output terminal of the operational amplifier generates the activation signal.

10. The voltage converting apparatus as claimed in claim 7, wherein the second comparator comprises:
- an operational amplifier, having a positive input terminal receiving the third voltage, and a negative input terminal receiving the fourth voltage; and
- an inverter, having an input terminal coupled to a forward output terminal of the operational amplifier, and an output terminal generating the activation signal.

\* \* \* \* \*